United States Patent [19]

Schreiber et al.

[11] Patent Number: 4,779,687
[45] Date of Patent: Oct. 25, 1988

[54] ELECTRIC TOOL WITH SOURCE OF POWER INDEPENDENT OF THE LINE

[75] Inventors: Wolfgang Schreiber, Stuttgart; Manfred Fink, Eberstadt; Ewald Hald, Filderstadt; Martin Schultheiss, Schwäbisch Gmünd; Manfred Ludwig, Stuttgart; Heinrich Henssler, Schwäbisch Gmünd, all of Fed. Rep. of Germany

[73] Assignee: C. & E. Fein GmbH & Co., Stuttgart, Fed. Rep. of Germany

[21] Appl. No.: 8,936

[22] Filed: Jan. 30, 1987

[30] Foreign Application Priority Data

Mar. 26, 1986 [DE] Fed. Rep. of Germany ....... 3610221

[51] Int. Cl.⁴ .............................................. B25F 5/02
[52] U.S. Cl. .................................... 173/170; 173/171
[58] Field of Search ...................... 173/163, 170, 171; 81/489; 7/167; 439/335, 337; 403/331; 310/50; 30/DIG. 1

[56] References Cited

U.S. PATENT DOCUMENTS

| | | | |
|---|---|---|---|
| 1,539,069 | 5/1925 | Brockett | 173/70 |
| 3,141,359 | 7/1964 | Bennett et al. | 310/50 |
| 3,734,207 | 5/1973 | Fishbein | 173/163 |
| 4,616,169 | 10/1986 | Proffitt | 310/50 |

Primary Examiner—Donald R. Schran
Assistant Examiner—James L. Wolfe
Attorney, Agent, or Firm—Max Fogiel

[57] ABSTRACT

An electric tool with a source of power that is independent of the line and with a transmission housing or motor housing that is also designed to function as a grip, with another grip merging into one side of it. To position the center of gravity such that the tool will be easier to handle and to allow the operator to continue working when one battery pack goes dead, attachments for battery packs are provided at the end of each grip.

11 Claims, 3 Drawing Sheets

ELECTRIC TOOL WITH SOURCE OF POWER INDEPENDENT OF THE LINE

BACKGROUND OF THE INVENTION

The present invention relates to an electric tool with a source of power that is independent of the line and with a transmission housing or motor housing that is also designed to function as a grip, with another grip merging into one side of it.

Electric tools of this type are known, and are often called battery-operated devices. At the end of the grip is an attachment for a rechargeable batter pack (EPA No. 71 356). Sometimes, however, if the device is shaped like a rod, the batteries are inserted or embedded inside the grip (Ger. OS No. 2 441 047).

The point of gravity in such devices is situated in the vicinity of the battery pack, partly because of their relatively heavy weight. The battery packs can often weigh more than the motor and transmission together. This is a serious drawback in relation to ease of handling. Rod-shaped devices with batteries can be recommended for applications in which they are employed upright, in conveyor-belt assembly for example. Pistol-shaped battery-operated devices on the other hand are not appropriate for applications in which they must be employed upright because the battery pack on the end of the grip helps to displace the point of gravity far out of the operating axis.

SUMMARY OF THE INVENTION

The object of the present invention is to provide a battery-operated device wherein the center of gravity is located in such a way that the device can be easily handled in as many operating positions as possible.

This object is attained in accordance with the invention in an electric tool of the type initially described by an improvement wherein attachments for battery packs are provided at the end of each grip (or at the end of the transmission housing or motor housing and at the end of the grip).

This design allows the the battery-operated device to be employed either like a rod-shaped device, without a battery pack on the pistol grip, or like a pistol-grip device. The design provides not only the aforesaid human-engineering advantage but also the possibility of continuing a job even when one battery pack goes dead. The device can be shifted over to the still charged battery pack simply by reversing a two-way switch. A battery-charge indicator is practical to inform the operator that a battery pack is discharged. The double supply of battery packs also makes it possible to work twice as long as with a conventional device.

To increase ease of operation it is conceivable to replace the switch with a switching circuit that will always switch over to whichever battery pack has the highest charge. Thus, when one battery pack is discharged, the device will automatically switch over to the charged pack and the battery-charge indicator will signal that the discharged pack is dead.

One embodiment of the invention has undercut rails at the ends of the grips and matching structures on the face of the battery packs. This measure makes it possible to replace battery packs very easily and to keep them aligned when adding and removing them. The undercuts in the rails simultaneously ensure reliable attachment, so that the contacts between the battery pack and the grip will remain in constant relationship. It is only this relatively flat surface-to-surface attachment between the battery pack and the grip that makes it possible to mount a pack on either the rod grip or the pistol grip as desired and very compactly.

The position of the contacts on one longitudinal side of the rails simplifies installing the contacts because both can be mounted on the base plate simultaneously. This applies not only to the contacts on the battery pack but also to those on the end of the grip.

To prevent the battery packs from discharging unintendedly when laid down on a conductive material, the contacts project out of the rail to different extents. Thus, only one contact will touch it when the battery pack is laid down on a flat surface.

Embedding the contacts in the rails will provide additional security against discharging. This system, although somewhat more expensive that the foregoing design, is also more reliable.

A locking mechanism is provided to prevent the battery pack from coming loose from the grip. This locking mechanism consists in a practical way of a tongue with a nose secured to the battery-pack base plate. The nose prevents the battery pack from falling out unintendedly once it has been snapped in.

A cover that covers the exposed rails is provided for use when the battery-operated device is employed with only one battery pack. The cover is necessary to protect the rails from contamination and damage. One face of the cover is shaped like the battery-pack base plate. The other face is provided in a practical way with a clip mechanism for holding tools (chuck keys, screwdriver blades, drill bits, etc.).

A preferred embodiment of the invention will hereinafter be described with reference to the appended drawings. It is to be understood, however, that this is merely by way of example and that the scope of the protection sought for the invention is defined exclusively in the claims.

DETAILED DESCRIPTION OF THE PREFERRED EMBODIMENTS

Figure 1:
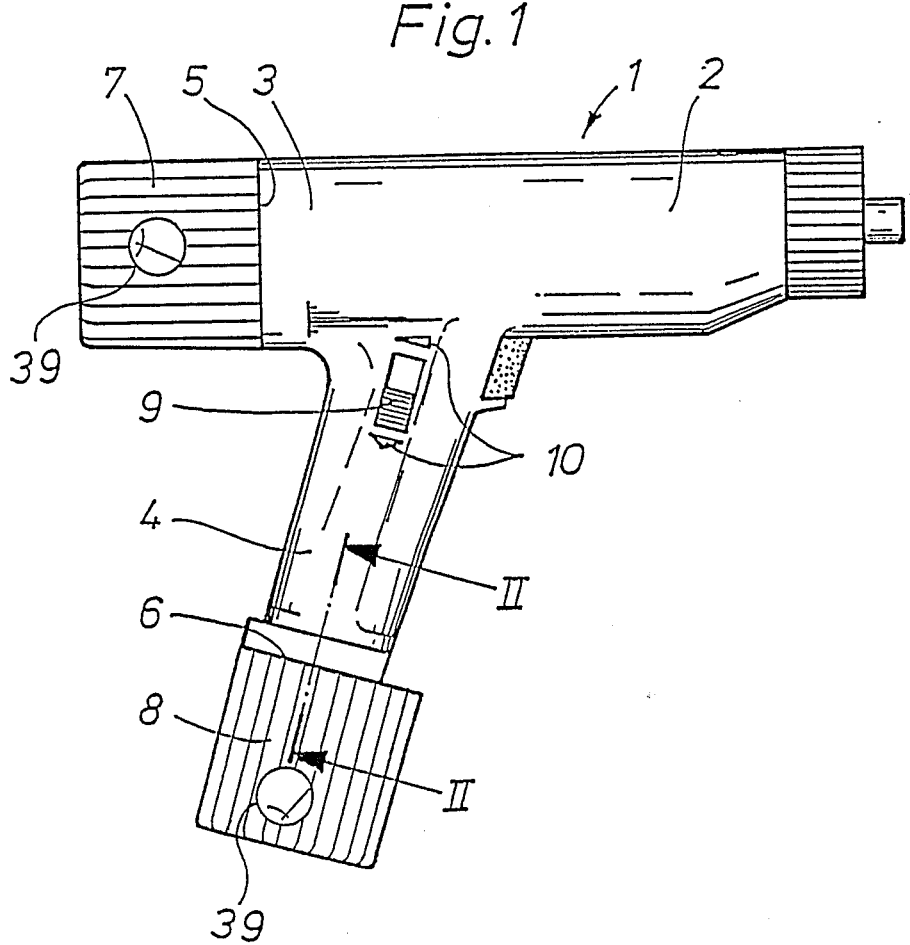
FIG. 1 is a side view of a battery-operated device in accordance with the invention.

The battery-operated device 1 illustrated in FIG. 1 is a power screwdriver. It has a transmission housing or motor housing 2 that merges into a grip 3 and another, pistol-type, grip 4. First grip 3 can vary extensively in length because the operator can also grasp transmission housing or motor housing 2 with the hand. A battery pack 7 is secured to the end 5 of first grip 3 and another battery pack 8 to the end 6 of second grip 4. At the intersection between grips 3 and 4 is a two-way switch 9, which can be employed to shift the motor from one battery pack to the other. Symbols 10 inform the operator which battery pack 7 or 8 is supplying the power.

The two-way switch 9 has two positions. In one position one of the two battery packs 7,8, is connected to operate the motor or tool, whereas the other battery pack is connected to operate the motor when the switch is in the other or second position. Indicators 39 may be mounted on each battery pack for showing the level of charge of the battery pack.

Figure 2:
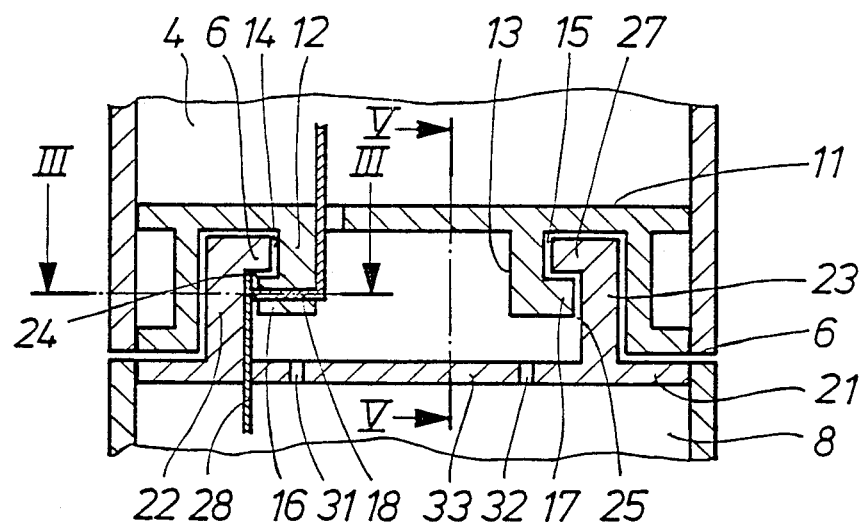
FIG. 2 is a section along the line II—II in FIG. 1.
Figure 3:
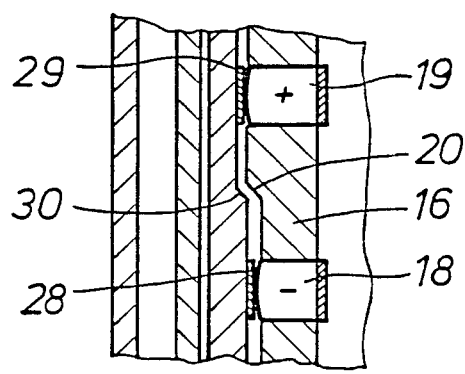
FIG. 3 is a section along the line III—III in FIG. 2.

FIG. 2 illustrates the end 6 of second grip 4, which is connected to battery pack 8. Secured to end 6 is a base plate 11, on which two parallel rails 12 and 13 project toward battery pack 8. Rails 12 and 13 are provided with undercuts 14 and 15, which face toward the parallel edges of second grip 4. Extending through undercuts 14 and 15 are collars 16 and 17. Two contacts 18 and 19 emerge from the face of collar 16. As will be especially evident from FIG. 3, collar 16 is not equally wide over its total extent, but has a shoulder 20 between contacts 18 and 19. Shoulder 20 prevents a conductive connection between contacts 18 and 19 when a device that a battery pack has been removed from is laid down.

The half of the connection on second grip 4 has a matching half on battery pack 8, where another base plate 21 is secured to the edge of the pack. The pack has two rails 22 and 23, which also have undercuts 24 and 25, constituting two other collars 26 and 27 that can engage the undercuts 14 and 15 in the end 6 of second grip 4. Contacts 28 and 29 are embedded in undercut 24. Another shoulder 30 in undercut 24 matches the shoulder 20 in the end 6 of second grip 4.

Figure 4:
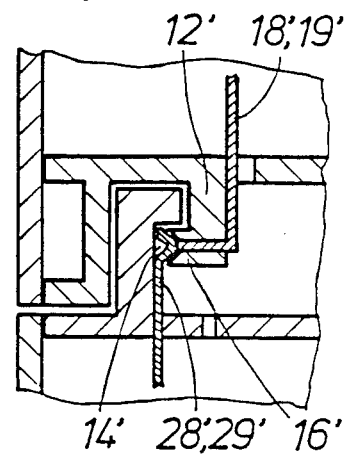
FIG. 4 illustrates a variant of the device illustrated in FIG. 2.

The contacts 18' and 19' illustrated in FIG. 4 are, like those in FIG. 2, positioned in a collar 16' in rail 12'. In this case, however, contacts 18' and 19' do not project beyond collar 16' but are embedded in it. The contacts 28' and 29' in undercut 14' are accordingly provided with a matching curved surface to allow contacts 28' and 29' to rest against the embedded contacts 18' and 19'. Thus, there is no necessity for a shoulder in collar 16'.

Figure 5:
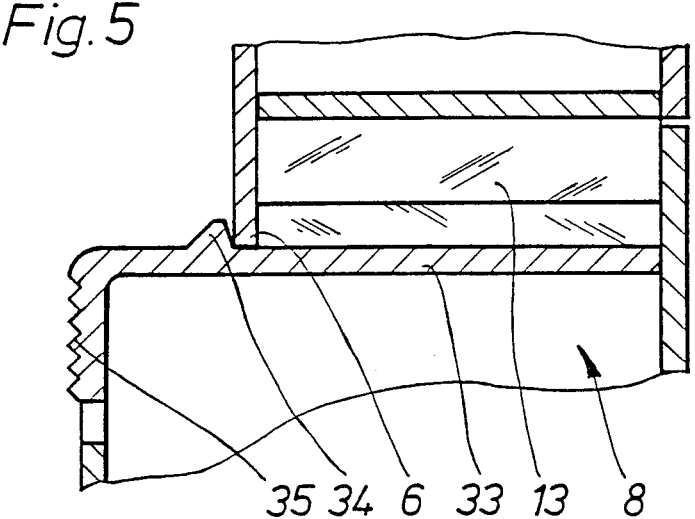
FIG. 5 is a section along the line V—V in FIG. 2.

FIG. 5 illustrates how battery pack 8 is attached to the end 6 of second grip 4. Base plate 21 has two slots 31 and 32 in the middle, between and parallel to rails 22 and 23.

Slots 31 and 32 extend from one side, the side that is inserted first, not quite all the way to the other side of battery pack 8, creating a resilient tongue 33 in that area of base plate 21. The edge on one side of battery pack 8 extends far enough beyond base plate 21 to rest against rails 12 and 13 when the pack is attached. Tongue 33 has a nose 34 that extends across its major axis. Nose 34 is far enough away from the edge that rests against rails 12 and 13 to press against the opposite edge of second grip 4 from outside that edge. Thus, the end 6 of second grip 4 is tensioned between nose 34 and the edge of battery pack 8. The connection can be released by means of a purchase strip 35 on the end of resilient tongue 33 that can be employed to displace resilient tongue 33 and hence nose 34 as well from grip 4. It is conceivable to provide a tension connection of this type not only on base plate 21 but also in the opposite sense on base plate 11. Another method would be to mount the tension connection on the lateral edges of grip 4 or battery pack 8.

Figure 6:
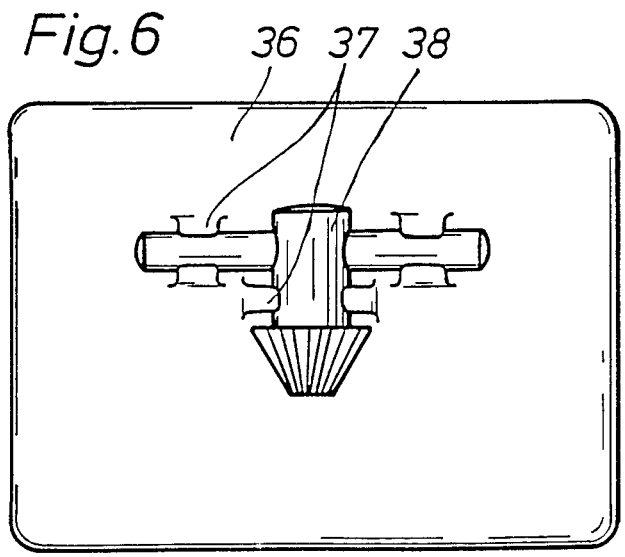
FIG. 6 is a rear view of a cover.

FIG. 6 illustrates a cover 36 with rails on its back that are identical with those on the base plate 21 of battery pack 8 but without contacts. A similar tension connection can also be provided. The function of cover 36 is to close off the end of a grip that does not have a battery pack attached to it to protect it from contamination and damage. Cover 36 has in a practical way snap-in webs 37 for securing a tool 38, a chuck key in FIG. 6, although screwdriver blades, drill bits, and other structures can also be secured.

The invention has been described herein with reference to an exemplary embodiment. It will be understood, however, that it is receptable of various modifications, which will offer themselves to those skilled in the art and which are intended to be encompassed within the protection sought for the invention as set forth in the appended claims.

We claim:

1. An electric tool having a source of power that is independent of a utility power supply line, comprising: a housing having a grippable surface which may be gripped by a user of the electric tool; a grip-shaped portion extending from a side of said housing which may also be gripped by the user; first battery holding means attached to an end of said housing, and second battery holding means attached to an end of said grip-shaped portion for holding two battery packs in said tool, said electric tool having a center of gravity located by a combination of said two battery holding means and said two battery packs so that said electric tool is substantially balanced in any operating position of said tool; said two battery packs increasing the duration of operation of said tool.

2. An electric tool as defined in claim 1, including a toggle switch for switching back and forth from one battery pack to the other battery pack, in said first and second battery holding means attached to the end of said housing and to an end of said grip-shaped portion, said toggle switch having a first position for connecting one battery pack to operate said electric tool said toggle switch having a second position for connecting the other battery pack to operate said electric tool.

3. An electric tool as defined in claim 2, including a switching circuit for switching power selectively to that battery pack having the highest charge.

4. An electric tool as defined in claim 1, including indicator means on each battery pack for showing level of charge of the battery pack.

5. An electric tool as defined in claim 1, including rails with undercuts on said end of said housing and said end of said grip shaped portion for mating with substantially similar rails and undercuts on said battery packs.

6. An electric tool as defined in claim 5, including electrical contacts on a longitudinal side of one rail.

7. An electric tool as defined in claim 6, wherein said contacts project out of said one rail to different extents.

8. An electric tool as defined in claim 6, wherein said contacts are embedded in said one rail.

9. An electric tool as defined in claim 5, including a resilient tongue located parallel to said rails on each battery pack; and a nose-shaped portion on said tongue for snapping into said ends of said housing and said grip shaped portion.

10. An electric tool as defined in claim 5, including cover means having rails substantially identical to said rails and having snap-in webs for securing tools on a surface facing away from the rails on said cover means.

11. An electric tool having a source of power that is independent of a utility power supply line, comprising: a housing having a grippable surface which may be gripped by a user of the electric tool; a grip-shaped portion extending from a side of said housing which may also be gripped by the user; first battery holding means attached to an end of said housing, and second battery holding means attached to an end of said grip-shaped portion for holding two battery packs in said tool, said electric tool having a center of gravity located by a combination of said two battery holding means and said two battery packs so that said electric tool is substantially balanced in any operating position of said tool; said two battery packs increasing the duration of operation of said tool; a toggle switch for switching back and forth from one battery pack to the other battery pack in said first and second battery holding means attached to the end of said housing and to an end of said grip-shaped portion, said toggle switch having a first position for connecting one battery pack to operate said electric tool, said toggle switch having a second position for connecting the other battery pack to operate said electric tool; a switching circuit for switching power selectively to that battery pack having the highest charge; indicator means on each battery pack for showing level of charge of the battery pack; rails with undercuts for said end of said housing and said end of said grip-shaped portion for mating with substantially similar rails and undercuts on said battery packs; electrical contacts on a longitudinal side of one ral; said contacts projecting out of said one rail to different extends; a resilient tongue located parallel to said rails on each battery pack; a nose-shaped portion on said tongue for snapping into said ends of said housing and said grip-shaped portion; cover means having rails substantially identical to said rails and having snap-in webs for securing tools on a surface facing away from the rails on said cover means.

* * * * *